United States Patent
Bechhoefer

(10) Patent No.: US 11,754,592 B1
(45) Date of Patent: Sep. 12, 2023

(54) SYSTEM FOR DETECTING PEAKS IN VIBRATIONAL ENERGY SPECTRA

(71) Applicant: Green Power Monitoring Systems, Inc., Cornwall, VT (US)

(72) Inventor: Eric R Bechhoefer, Cornwall, VT (US)

(73) Assignee: GPMS International, Inc., Cornwall, VT (US)

(*) Notice: Subject to any disclaimer, the term of this patent is extended or adjusted under 35 U.S.C. 154(b) by 0 days.

(21) Appl. No.: 17/747,048

(22) Filed: May 18, 2022

Related U.S. Application Data

(63) Continuation-in-part of application No. 16/779,934, filed on Feb. 3, 2020, now abandoned.

(60) Provisional application No. 62/801,760, filed on Feb. 6, 2019.

(51) Int. Cl.
  *G01P 15/097* (2006.01)
  *G06F 17/14* (2006.01)
  *G01P 15/08* (2006.01)

(52) U.S. Cl.
  CPC ........ *G01P 15/097* (2013.01); *G01P 15/0802* (2013.01); *G06F 17/142* (2013.01)

(58) Field of Classification Search
  CPC ........ G01P 15/097; G01P 15/08; G01P 15/02; G01P 15/00; G01P 15/0802; G06F 17/142; G06F 17/141; G06F 17/14; G06F 17/10; G06F 17/00
  See application file for complete search history.

(56) References Cited

U.S. PATENT DOCUMENTS

| | | | |
|---|---|---|---|
| 10,598,568 B1* | 3/2020 | Morey | G01M 13/045 |
| 2010/0250047 A1* | 9/2010 | Balasu | B60T 17/221 |
| | | | 701/31.4 |
| 2011/0125419 A1* | 5/2011 | Bechhoefer | F03D 17/00 |
| | | | 702/34 |
| 2011/0257901 A1* | 10/2011 | Bechhoefer | G01H 1/00 |
| | | | 702/56 |
| 2015/0012247 A1* | 1/2015 | Bowers, III | G01N 29/4454 |
| | | | 702/189 |

* cited by examiner

*Primary Examiner* — Mohamed Charioui
(74) *Attorney, Agent, or Firm* — STGIP, LLC; Shawn Gordon

(57) ABSTRACT

The magnitude and frequency of a peak in detected vibrational energy emitted from a component that includes a periodic portion is provided to monitor the component for faults. A Fast Fourier Transform of the signal is taken to generate a spectrum. A maximum index in the spectrum is found between a determined frequency bound. An array of parameters is generated and a determined optimized transform root is used on the array of parameters. An interpolated peak location is estimated based on the array and an interpolated frequency is found based on the peak location. An interpolated magnitude is then determined. The use of the optimized transform root in the processing results in significant improvements to the magnitude and frequency estimations, which can improve, for example, detection of defects from vibration spectra of rotating components, estimates of energy radiated from an electronic component, or analysis of spectral content of ionizing radiation.

14 Claims, 10 Drawing Sheets

SYSTEM FOR DETECTING PEAKS IN VIBRATIONAL ENERGY SPECTRA

FIELD OF THE INVENTION

The present invention generally relates to systems and methods for detecting and analyzing signals from components that emit vibrational energy. In particular, the present invention is directed to a system and method for determining the magnitude and frequency of a sinusoidal portion of a detected vibrational energy signal.

BACKGROUND

Common in many fields of science and industry is the estimation of the magnitude and frequency of measured or detected periodic, sinusoidal signals generated by various components or systems. This estimation process is ubiquitous and the foundation of many standards and procedures, including in aircraft component health monitoring, and often involves use of the Fourier transform. For example, in utility power generation and distribution systems, i.e., the electrical grid, it is common for line frequency to be run at 60 Hz. However, this frequency is actually 60 Hz+/−some small percentage error. In order to make sure the frequency stays within acceptable margins, power providers must determine both the frequency and magnitude of the voltage and the current of electricity being generated at power plants. An accurate way to determine these parameters involves performing a Fourier transform on the measured data.

Similarly, the standards for both the International Electrotechnical Commission (IEC) and the Environmental Conditions and Test Procedures for Airborne Equipment (DO-160) require taking measurements of electromagnetic radiation related to the control of emission and transmission of radiant energy from equipment. These measurements are typically made using spectrum analyzers that incorporate Fourier transform.

Likewise, in condition monitoring based on the detection of vibration, signals relating to rotating components of machines are monitored so that mechanical diagnostics of the equipment may be performed while the equipment is in use. Periodic signals associated with any nonconformity of the rotating components, such as shaft imbalance, gear faults, and bearing faults, are predominantly quantified using spectral analysis. This spectral analysis can be done by measuring vibration with a calibrated accelerometer. The analog signal from the accelerometer is digitized and an analysis is performed that uses Fourier transforms in order to measure the magnitude of vibration at a given frequency. The frequency is associated with the properties of the rotating component. For example, a wind turbine may have a high-speed shaft driving a generator at 1800 RPM (or 30 Hz). If the shaft has a 24-tooth pinion, the frequency associated with this gear is 720 Hz (24×30 Hz). The energy associated with this frequency can be quantified using the Fourier transform.

In another example, for the evaluation of the performance and load of an induction motor, it is common to estimate slip. Slip is the percent difference between the synchronous speed (i.e., line frequency) and the speed of the motor. Excessive slip indicates the load on the motor is beyond the design limit. It is usually assumed that synchronous speed is 50 or 60 Hz, but at any given time the line frequency has error. Taking the Fourier transform of the line current (using a current transformer), will give a more exact measure of the synchronous speed. And a more exact determination of the motor speed can be made by measuring the shaft order 1 vibration with an accelerometer and then taking the Fourier transform. Thus, estimating slip can be improved using the Fourier transform.

In addition, many systems or tools that measure periodic signals need to be calibrated to ensure accuracy. For example, it is common in the field of condition monitoring to test accelerometers with a handheld shaker (such as Model #394C06 available from PCB Piezotronics of Depew, NY) with an acceleration output of 1.00 G's (+/−3%) and an operating frequency of 159.2 Hz (+/−1%). In order to ensure compliance with any specification, it is important to accurately measure both the magnitude and frequency of the shaker. This analysis may be validated using the Fourier transform of the measured signal from the shaker.

Although Fourier transforms are useful in these applications, taking exact Fourier transforms can be impossible and is often impractical. For most applications, then, a discrete Fourier transform (DFT) is implemented. Because of the high computational load often required even for DFT, however, a Fast Fourier Transform (FFT), which is an algorithm that computes the DFT of a sequence, or its inverse, is typically used. There is a need, however, in many applications, for improved FFT methods that can attain greater levels of accuracy for certain estimates, such as for magnitude and frequency of measured periodic, sinusoidal signals, without significantly increasing computational load.

SUMMARY OF THE DISCLOSURE

A system for detecting faults for components of a helicopter includes a ball bearing of a component of the helicopter, wherein the ball bearing includes a cage, a ball, an inner race, and an outer race. An accelerometer is positioned to detect vibrational energy emitted from the ball bearing, wherein the vibrational energy includes vibrational energy emitted by the cage, the ball, the inner race, and the outer race, wherein the vibrational energy includes at least one periodic, sinusoidal portion, and wherein the accelerometer generates a signal representative of the detected vibrational energy. A processor configured to receive the signal and determine a frequency peak and magnitude of the at least one periodic, sinusoidal portion based on an optimized transform root.

In another embodiment, a system for estimating magnitude and frequency of a signal representative of energy emitted from an apparatus includes a sensor configured to measure the signal representative of energy emitted from the apparatus, wherein the signal including a periodic, sinusoidal portion. A processor is configured to receive the signal and has a set of instructions for taking a FFT of the signal using Welch's method to generate a spectrum, determining a maximum index in the spectrum between a determined frequency bound, generating an array of parameters, the array of parameters being generated in part based on three data points around the maximum index, determining an optimized transform root by minimizing an objective function that fits the array of parameters, determining an interpolated peak location of the spectrum based on the array, determining an interpolated frequency of the peak location, and determining an interpolated magnitude of the spectrum at the interpolated frequency.

In an embodiment, a method for estimating magnitude and frequency of a signal representative of energy emitted from a system includes sensing the signal emitted from the system, wherein the signal includes a periodic, sinusoidal portion. A spectrum is generated by taking a FFT of the signal, a maximum index in the spectrum between a determined frequency bound is determined, an array of parameters is determined, and an optimal transform root for estimating the magnitude and the frequency of the periodic portion of the signal is determined. An interpolated peak location based on the array is determined, an interpolated frequency of the periodic portion of the signal based on the peak location is determined, and an interpolated magnitude of the periodic portion of the signal is determined.

In an embodiment, a method for estimating magnitude and frequency of a signal representative of energy emitted from a system includes measuring the signal emitted from the system, wherein the signal includes a periodic, sinusoidal portion, taking a FFT of the signal based on a sample rate and a window length to generate a spectrum of the measured energy, determining a maximum index of the spectrum between a frequency bound, compiling an array of parameters, wherein the array of parameters is generated based on three points around the maximum index including a first point from a maximum bin, a second point from a second bin just prior to the maximum bin, and a third point from a third bin just after the maximum bin, determining an optimal transform root, wherein the optimal root and the parameters are used to find a parabolic function representative of the spectrum between the frequency bound, determining an interpolated peak location of the spectrum within the frequency bound based on the array of parameters and the parabolic function, determining an interpolated frequency at the interpolated peak based on the interpolated peak, the maximum index, the window length, and the sample rate, and determining an interpolated magnitude at the interpolated peak based on the array of parameters and the interpolated peak location.

In addition, a system for detecting faults for components of a helicopter is provided that includes a ball bearing of a component of the helicopter, wherein the ball bearing includes a cage, a ball, an inner race, and an outer race, an accelerometer positioned to detect vibrational energy emitted from the ball bearing, wherein the vibrational energy includes vibrational energy emitted by the cage, the ball, the inner race, and the outer race, wherein the vibrational energy includes at least one periodic, sinusoidal portion, and wherein the accelerometer generates a signal representative of the detected vibrational energy, and a processor configured to receive the signal and determine a frequency peak and magnitude of the at least one periodic, sinusoidal portion based on an optimized transform root. Further, the processor may be configured to execute a set of instructions to take a FFT of the signal using Welch's method to generate a vibrational energy spectrum, determine a maximum index in the vibrational energy spectrum between a frequency bound, generate an array of parameters, the array of parameters being generated in part based on three data points located near the maximum index, determine an interpolated peak location of the vibrational energy spectrum using the optimized transform root, determine an interpolated frequency of the interpolated peak location, and determine an interpolated magnitude of the spectrum at the interpolated frequency.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

Figure 1:
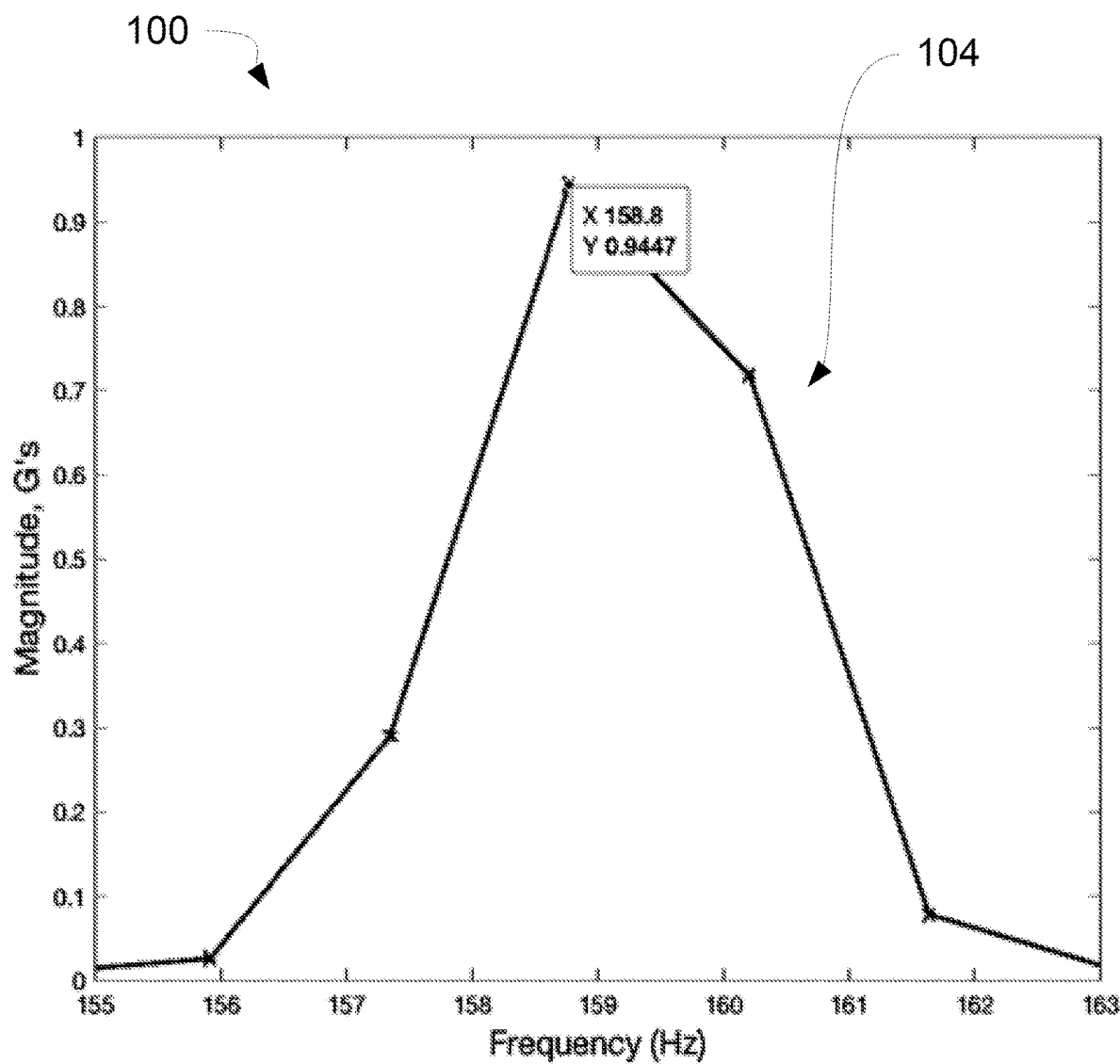
FIG. 1 is a graph showing a raw FFT of a 159.2 Hz signal at 1 G using a 4096 length FFT.

For condition monitoring of gears and shafts based on the detection of vibrational signals, there are a finite number of possible frequencies based on the parameters of the gear or shaft monitored because the vibrational frequencies of potential faults will be synchronous with the rotational speed of the component. However, for some components, such as bearings and impact sensors, there are an infinite number of possible frequencies for potential faults because these types of components are not synchronous with the rotation speed of an associated (i.e., connected) rotating component. The vibrational signals from such components may include a sinusoidal wave and the present invention determines the magnitude and frequency of a measured signal that includes a sinusoidal wave using a modified FFT, thereby improving signal resolution and thus fault detection for bearings and similar components that are often part of systems with rotation components, such as helicopters.

In the context of signal data analysis, the Fourier transform is used to decompose a time domain signal, which is the superposition of frequencies into the frequencies that make up the signal. In implementation, the Fourier transform is calculated using the FFT algorithm. The FFT makes an assumption that the measured signal is a finite sequence of equally spaced measurements. The bandwidth, or Nyquist frequency, of FFT, is half of the sampling rate (SR) of the discrete signal. The frequency resolution of the FFT is then the SR divided by the length, N, of the FFT, or SR/N.

It should be noted that there is some error in the FFT when the frequencies are not exact integers of the sample rate. A key property of sinusoids is that they are orthogonal at different frequencies; that is, $A_1 \sin(\omega_1+\phi_1)$ is orthogonal to $A_2 \sin(\omega_2+\phi_2)$. However, for sampled sinusoid signals having length N, such as those used in the FFT, this property of orthogonality only holds for those harmonics that are integer multiples of the sample rate divided by N. These frequencies, $f_k$, can be expressed in terms of the sample rate, $f_s$, as follows:

$$f_k = kf_s/N, \text{ where } k = 0, 1, 2, \ldots, N-1 \qquad \text{(Equation 1)}$$

The FFT is defined only for the frequencies ($\omega_k$) that are exactly integers of the sample rate ($f_s$), such as:

$$\omega_k = 2\pi k f_s/N \qquad \text{(Equation 2)}$$

For frequencies that are not exact integers of the sample rate, it can be shown that the FFT acts as a digital filter. The frequency response for any other frequency, at, is:

$$|X(\omega_x)| = |\sin\{(\omega_x - \omega_k)NT/2\}/\sin\{(\omega_x - \omega_k)T/2\}| \qquad \text{(Equation 3)}$$

where X is the frequency response as a function of $\omega_x$, and T is the period of $\omega_k$. This results in spectral leakage and error in the estimation of the FFT amplitude for any given frequency, $\omega_k$, that is not an integer of the sample rate. This spectral leakage is not minimized by increasing the length, N.

While there are a number of different algorithms for the FFT, many are based on the Cooley-Tukey method, which is a sort of "divide and conquer" algorithm that recursively breaks the length of each data point into a composite of $N=N_1 \times N_2$, where N is the composite size and $N_1$ and $N_2$ are smaller factors. The best known of these algorithms are based $N_2=2$, which results in a radix-2 algorithm. For these algorithms, the total length (N) of the FFT is necessarily a $2^n$ power, for example, 4,096 ($2^{12}$) or 8,192 ($2^{13}$).

One issue that sometimes needs to be addressed when using FFT for data analysis is the Gibbs phenomenon, which is observed in the Fourier series of a piecewise periodic function that has a jump discontinuity in a signal and occurs with finite data lengths. A method used to control the Gibbs phenomenon and therefore obtain a better estimate the power of a signal is Welch's method. Welch's method splits the signal into, typically, radix-2 lengths (the window length) and overlapped segments (the window length divided by two). The overlapped segments are then windowed, and a window function mitigates the Gibbs phenomenon. A typical window function, applied to the segment, is the Hann window. The Hann window is smooth and bell shaped, and thereby mitigates the edge/jump discontinuity of a segment on which the FFT operates.

Welch's method returns the power of a signal in each frequency bin. The magnitude of the signal is then the square root of the power of the signal in a given frequency bin. The frequency resolution of each bin is a function of the sample rate and length to the window of Welch's method.

As an example, consider the calibration of a handheld shaker. An acquisition system may use an accelerometer to measure voltage by an analog-to-digital converter (ADC). The ADC sample rate is based on times fixed by a clock or a crystal oscillator. Crystal oscillator devices, such as the NDK NX3225SA-12MHZ-STD-CSR-6 (made by NDK America, Inc.), have a frequency of 12 MHz+/−12 parts per million (ppm). The ADC sample rate is then the clock frequency divided by some radix-2 power. For example, a power of 11 would give an ADC sample rate of 12,000,000/2,048, or 5,859 samples per second. Given the SR of 5,859 samples per second and a Welch's window of 4,096, the resolution of each FFT frequency bin is 1.4304 Hz.

If the vibration frequency of the handheld shaker is exactly 159.2 Hz, then the exact frequency bin on the FFT would be the 111.296 bin index (i.e., 159.2/1.4304). Unfortunately, the resolution of the FFT, as previously shown, is finite, therefore some of the energy in the 159.2 Hz acceleration is found in bin 111 (corresponding to a frequency of 158.776 Hz), and some is found in bin 112 (corresponding to a frequency of 160.21 Hz), as can be seen in graph 100 in FIG. 1, which shows the magnitude as a function of frequency of spectrum 104. This is an example of spectral leakage. Note also in FIG. 1 that at the maximum magnitude is 0.944 G's, which translates to a 5% error for the measured input signal for the 1 G handheld shaker. In this example, an error of that amount would mean the handheld shaker would fail the calibration.

In general, a strategy for improving the calibration process may be to try to increase the resolution by either reducing the sample rate or increasing the window length of the FFT. If the window in the above example was increased to 32,768, then the bin index would become 890 (159.2/(5,859/32,768)). This corresponds with a frequency of 159.13, which is closer to true frequency, but the magnitude is then only 0.915 G's because more energy is found in bin index 891. At noted earlier, increasing N does not reduce spectral leakage.

In the present invention, in order to better estimate the magnitude and frequency of a measured signal, the estimation of magnitude and frequency incorporates an interpolation technique into the Fourier transform. As can be seen in spectrum 104 of the example shown in FIG. 1, the maximum energy is likely found at a frequency between 158.8 Hz and 160.2 Hz. Further, there is a not insignificant amount of energy at 157.3 Hz. Therefore, interpolation may allow the maximum energy value and the frequency at which it occurs to be estimated by assuming a continuous function or distribution. A polynomial quadratic, which is a smooth function, can be used to interpolate the maximum energy through, for example, a triplet of points.

A polynomial quadratic has a general formula that can be expressed as:

$$y(x) = a(x-p)^2 + b \qquad \text{(Equation 4)}$$

where a is the curvature and depends in this context on the window used in the FFT; p is the center point and gives the interpolated peak location; and b is the amplitude that here equals the peak amplitude of the FFT spectrum. The three sample points nearest the peak can be defined as:

$$y(-1) = \alpha, \ y(0) = \beta, \text{ and } y(1) = \lambda,$$

where the bins about those three points are defined at [−1 0 1]. Substituting the bin values for x in Equation 4 and simplifying results in the following expressions for $\alpha$, $\beta$, and $\lambda$:

$$\alpha = ap^2 + 2ap + a + b \qquad \text{(Equation 5)}$$

$$\beta = ap^2 + b \qquad \text{(Equation 6)}$$

$$\lambda = ap^2 - 2ap + a + b \qquad \text{(Equation 7)}$$

By combining equations, substituting, and rearranging terms, the following relations can be derived:

$$\alpha - \lambda = 4ap \quad \text{(Equation 8)}$$

$$p = \alpha - \lambda/4a \quad \text{(Equation 9)}$$

$$\alpha = ap^2 + (\alpha - \lambda/2) + a + (\beta - ap^2) \quad \text{(Equation 10)}$$

$$a = 1/2(\alpha - 2\beta + \lambda) \quad \text{(Equation 11)}$$

Then, the interpolated peak location, p, in bins, can be expressed as:

$$p = 1/2 \frac{\alpha - \lambda}{\alpha - 2\beta + \lambda} \quad \text{(Equation 12)}$$

If k is the index of the maximum spectral value, then the interpolated frequency (frq) would be determined as follows:

$$frq = (k + p)SR/\text{window length} \quad \text{(Equation 13)}$$

The interpolated magnitude (mag) could be determined from the following:

$$mag = y(x) = \beta - 1/4(\alpha - \lambda)p \quad \text{(Equation 14)}$$

Figure 2:
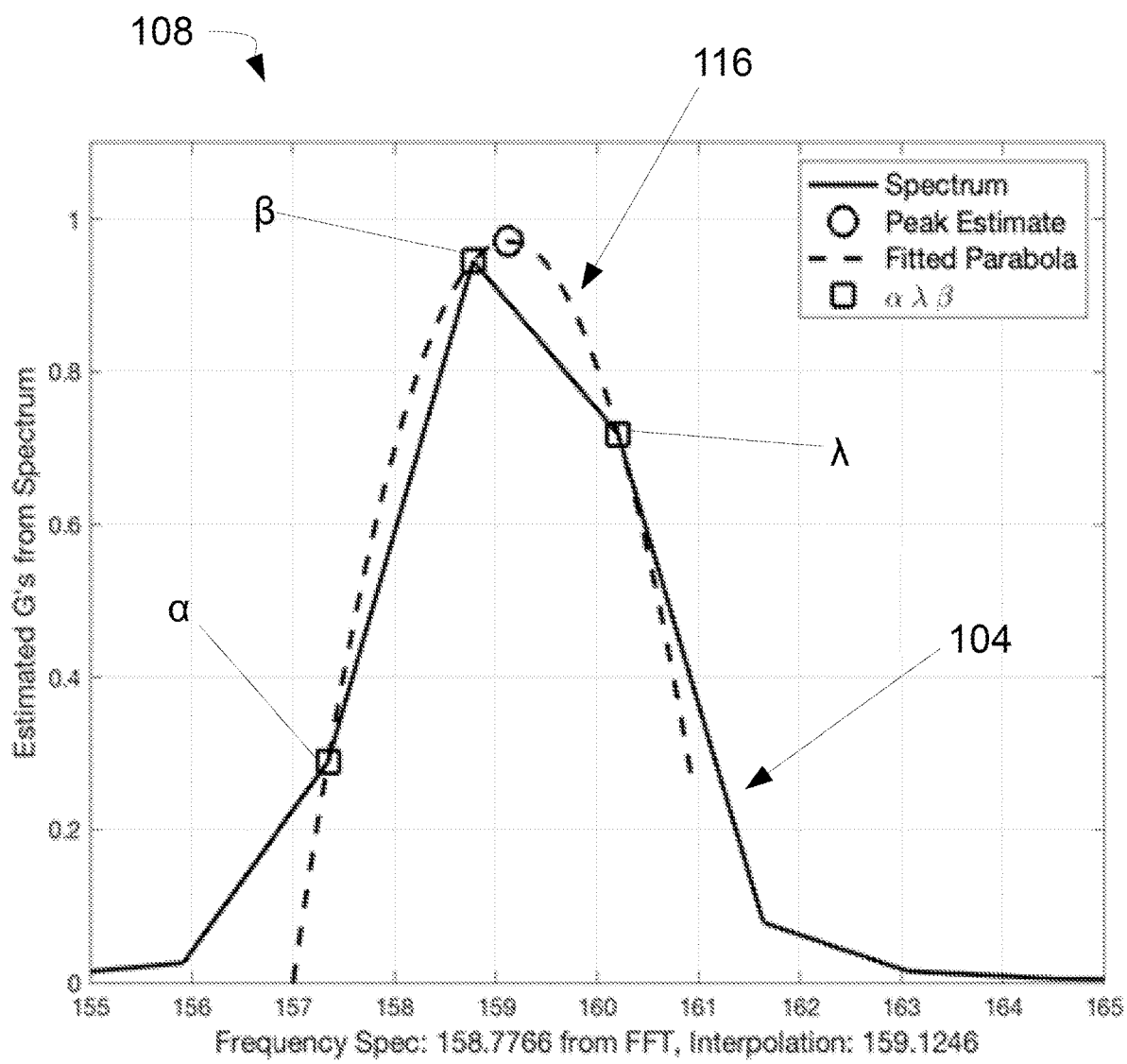
FIG. 2 is a graph of a parabolic interpolation of the spectrum shown in FIG. 1.

In the example data from FIG. 1, the three points at 157.346 Hz, 158.776 Hz, and 160.21 Hz, having energies of 0.2895 G, 0.9447 G, and 0.7184 G, respectively, can be used to interpolate the maximum energy. As can be seen from graph 108 shown in FIG. 2, these three points serve as the points through which a polynomial 116 is fitted for the data for spectrum 104, and are used to find values for α, β, and λ for the data. With no further transformation of this data, the above interpolation technique results in a peak value of 0.9708 G with a frequency of 159.1246 Hz.

These estimations of the magnitude and frequency are based on the interpolation without any additional transform. However, a Gaussian window magnitude is precisely a parabola on a dB scale, which implies that use of the above quadratic interpolation technique is exact dB scale. If, therefore, there is a transformation (perhaps logarithmic, which gives dB scale, or some other transform) that defines the relationship of three points in the spectrum (here, α, β, and λ) in which β is the maximum bin, α is the bin just prior the maximum, and λ is the bin just after the maximum, such that the three points lie on a parabola, then such a transformation would minimize the error between the true magnitude and frequency and the interpolated magnitude and frequency of the measured signal. A log transform is one option, although a log transformation tends to compress the peak values. Other potential transformations include the square root, the cube root, the fourth root, and the fifth root.

A test for such a transform would be bounded by the minimum error between the points of the interpolation and those points tested by the transform. The minimum error would then occur where a FFT bin is exactly the frequency of the sinusoidal signal being processed. For the given example with a SR of 5,859, a window of 4,096, and a desired frequency of 159.2, the exact frequency of zero error (at bin 111) would be 158.7766 Hz (111*5,859/4,096). The bound from bin 111 to bin 112 would be a frequency of 160.2070 Hz (112*5,859/4,095). The maximum magnitude error would then occur at 111.5, or a frequency of 159.4918 Hz.

At a high level, the test involves first taking the FFT of the measured sinusoidal signal for a frequency between a bound, in this example between 158.7766 Hz and 160.2070 Hz, using Welch's method. The spectrum data is then transformed by taking the log, the square root, or one of the other proposed transforms. Then the bin with the maximum value (i.e., the bin containing P) is determined and is used to find a value of k. The value of k can be used to calculate p, and then the associated interpolated frequency and transformed magnitude can be found. Taking the inverse transform of the calculated transformed magnitude allows the error between the interpolated magnitude and the magnitude of the sinusoidal signal to be evaluated.

Figure 3:
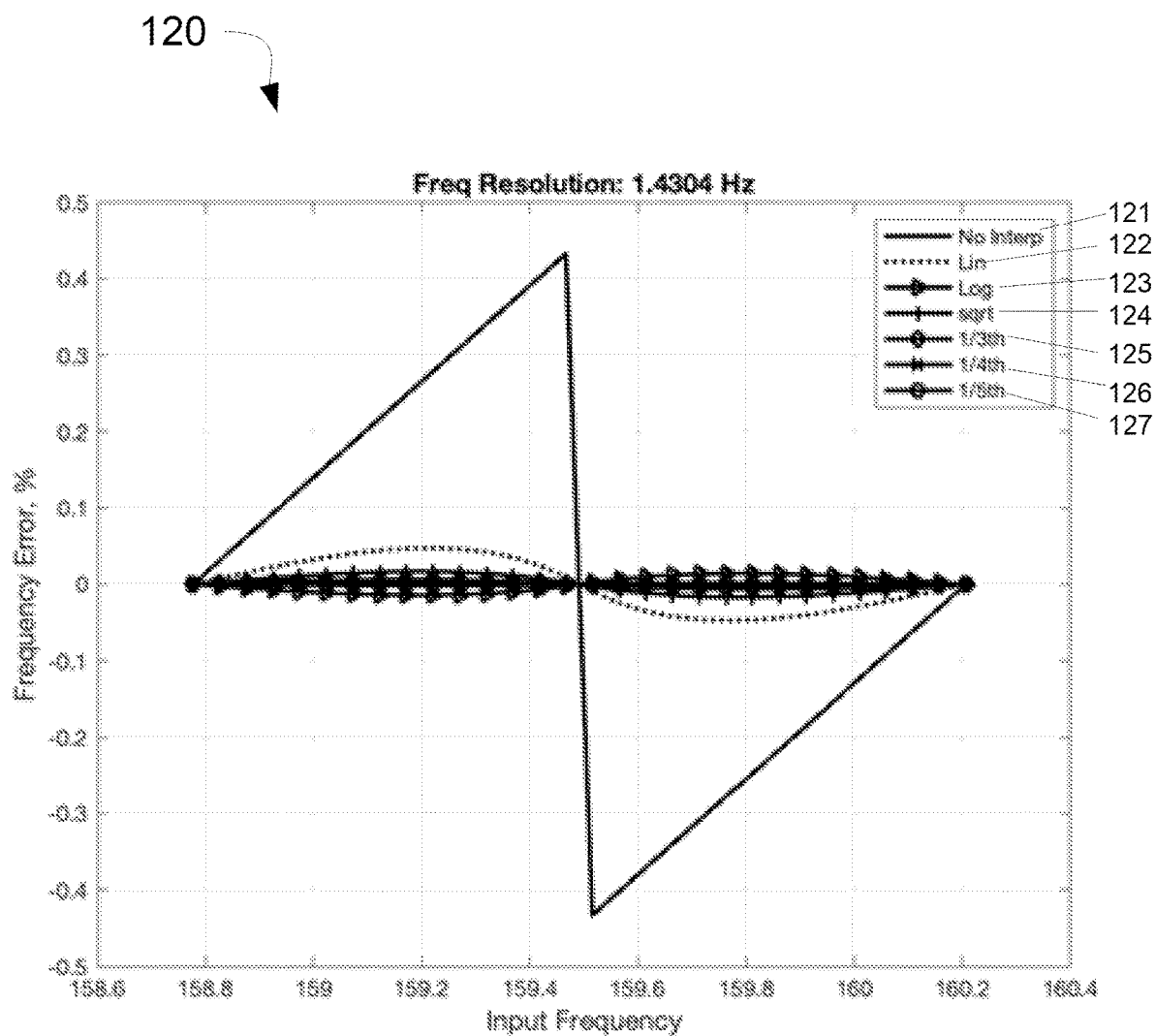
FIG. 3 is a graph showing bound on frequency error based a parabola interpolation for raw FFT and transforms using linear, log, square root, cube root, fourth root, and fifth root transforms.
Figure 4:
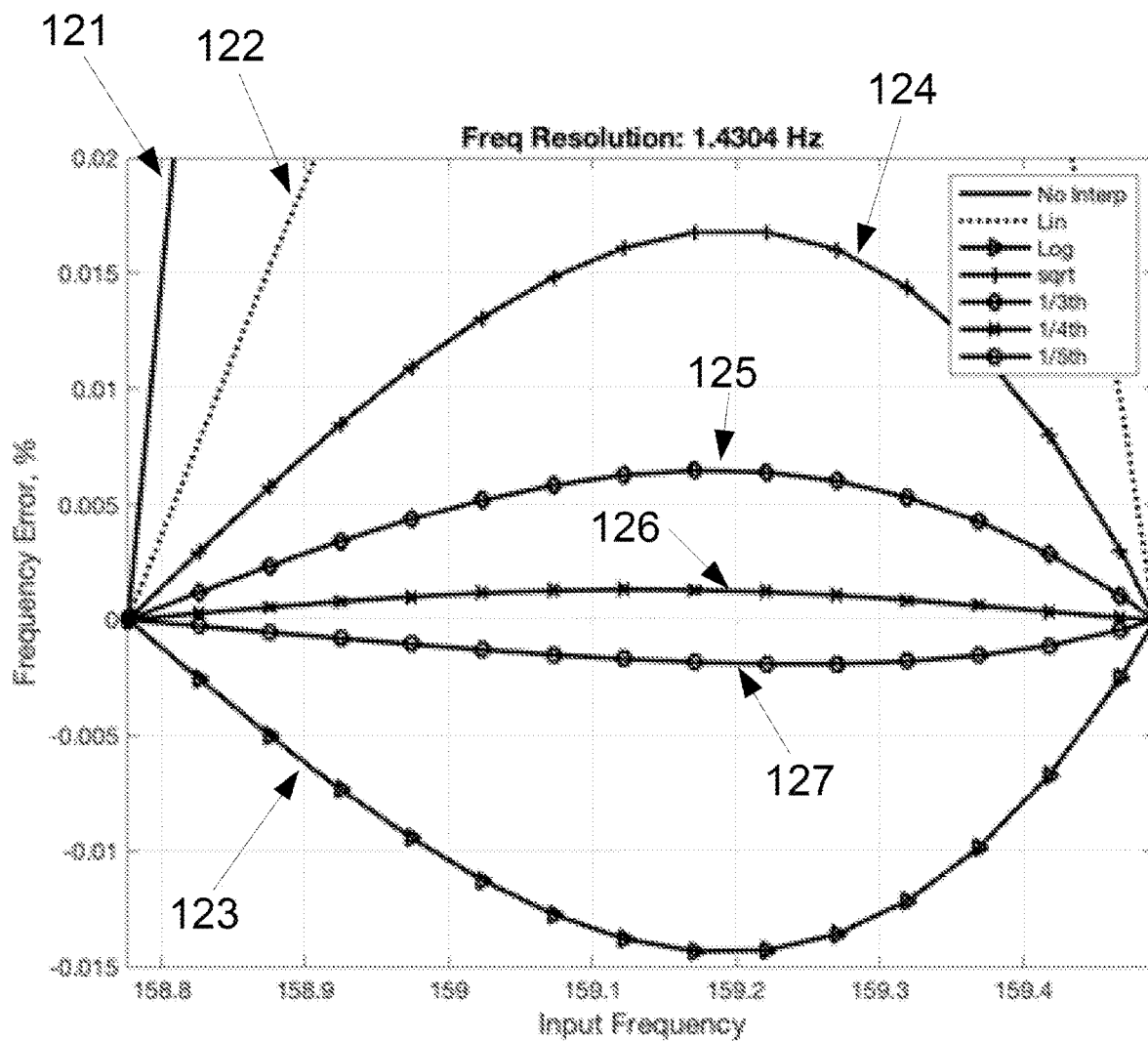
FIG. 4 is a zoomed view of a portion of the graph of FIG. 3.

FIG. 3 shows a graph 120 of the frequency determined by interpolation as described above with respect to a measured signal and the associated percentage error for those frequencies. Results are shown for raw FFT data 121 and for estimates made via the parabolic interpolation based on a linear transform 122, a log transform 123, a square root transform 124, a cube root transform 125, a fourth root transform 126, and a fifth root transform 127. The raw FFT results 121 show greater error compared to any of the parabolic estimates (122-127). In FIG. 4, a zoomed view of a portion of graph 120 is shown around 159 Hz, where it can be more easily seen that the estimates based on fourth root transform 126 and fifth root transform 127 show the least error.

Figure 5:
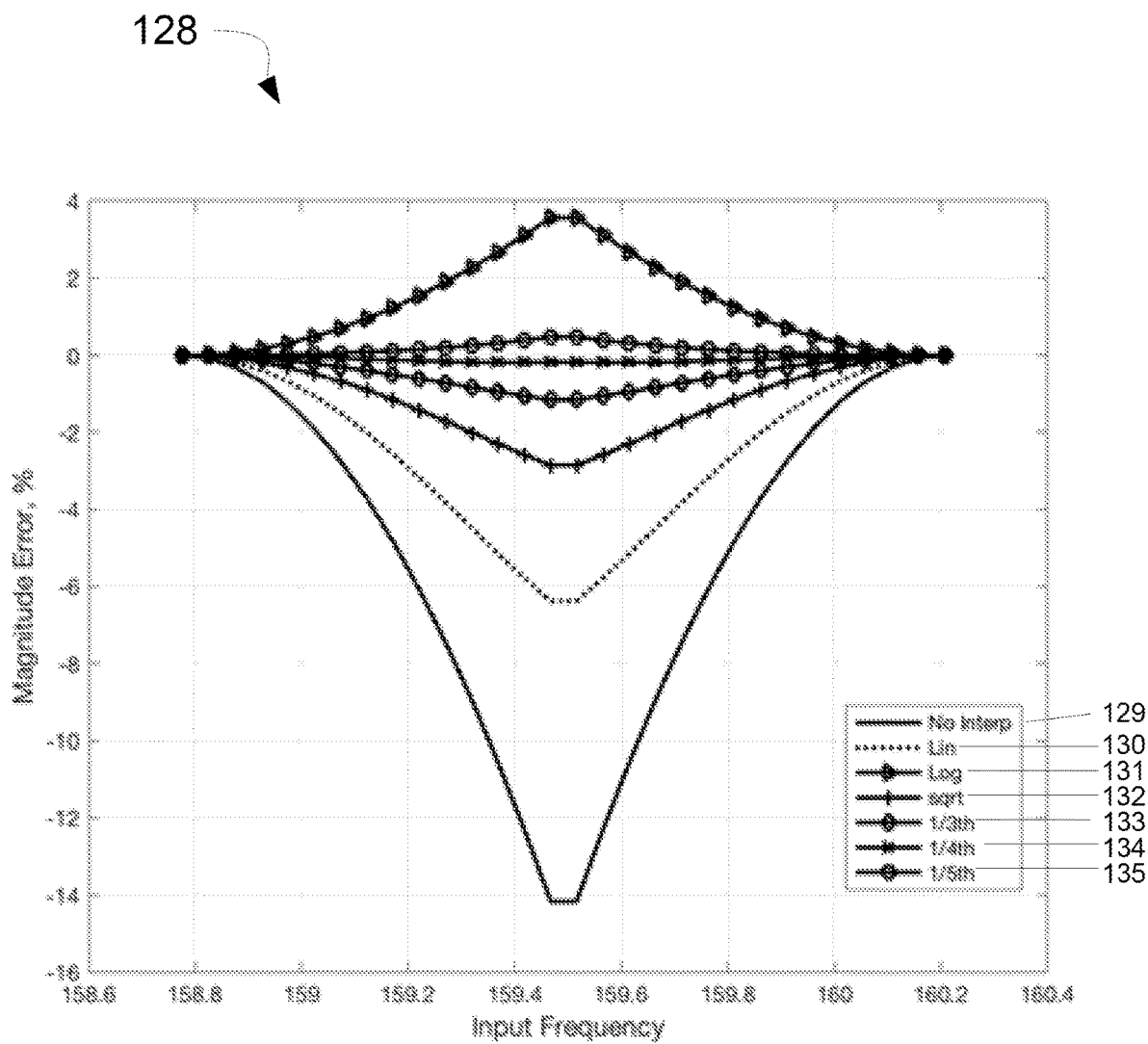
FIG. 5 is a graph of an example of percent magnitude error for estimations based on raw FFT, linear, log, square root, cube root, fourth root, and fifth root transforms.
Figure 6:
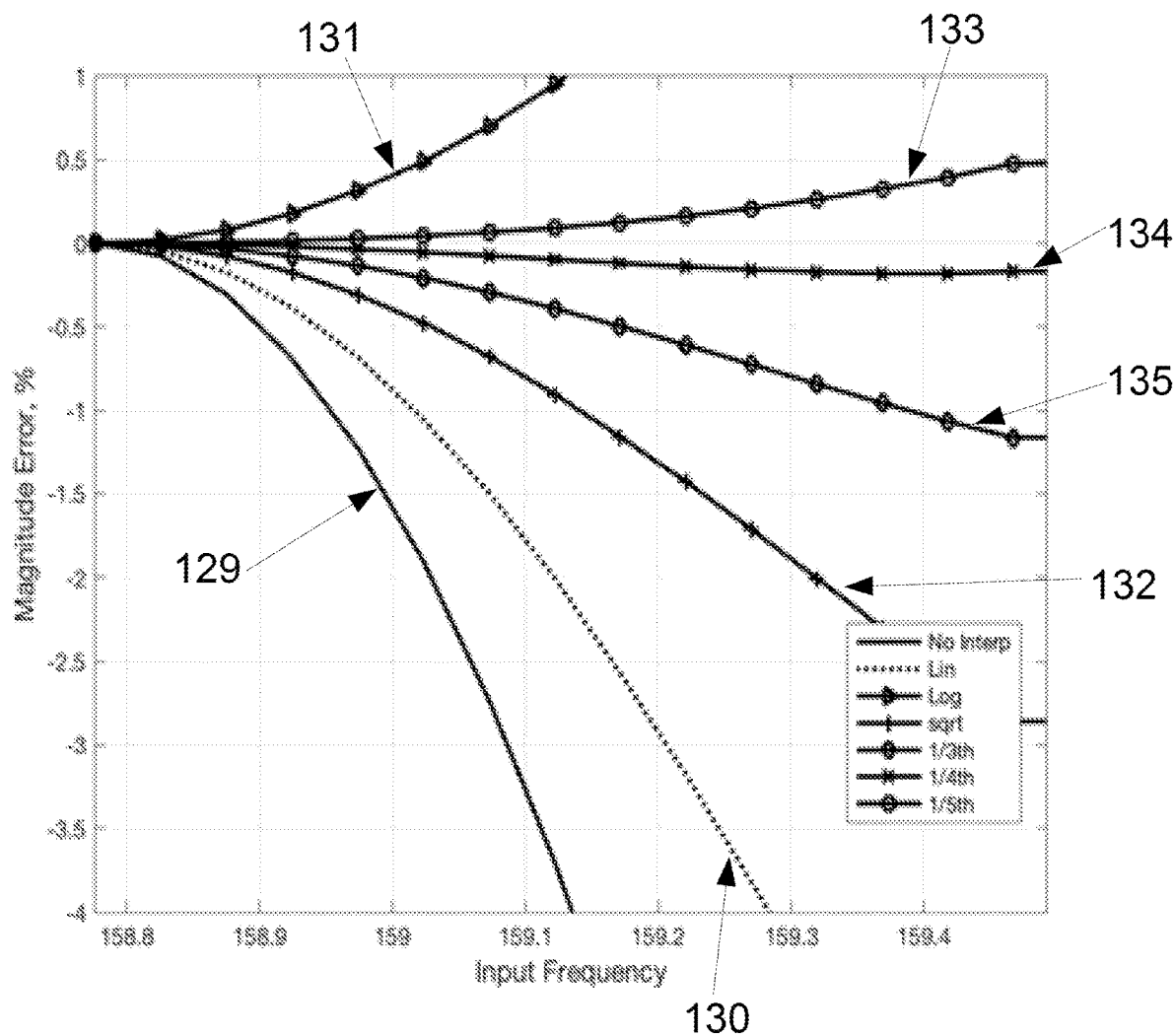
FIG. 6 is a zoomed view of a portion of the graph shown in FIG. 5.

FIG. 5 is a graph 128 from a measured signal processed as described above of input frequency and the associated magnitude percentage error for a raw FFT 129, and for parabolic estimates based on a linear transform 130, a log transform 131, a square root transform 132, a cube root transform 133, a fourth root transform 134, and a fifth root transform 135. A maximum error of 14% in raw FFT 129 is large in this context. In FIG. 6, a zoomed view of a portion of graph 128 is shown, where it can be more easily seen that the estimates based on the fourth root transform 134 and the fifth root transform 135 show the least error.

As can be seen, different transforms result in different percent errors for a given sinusoidal signal. An ideal root for minimizing percent error for a given signal can be estimated via an optimization approach. The optimization would require an objective function, which for this type of situation could be the mean square error, for example. That is, over the frequency in interest, for each trial transform, the performance metric will be the mean square error over the bounded frequencies. An optimization technique, such as Newton-Raphson method or other root-finding algorithm, can be used to find the optimal root. In the given example, the optimal root is determined to be the $4.3093^{th}$ root.

The optimal root is determined by finding the root that minimizes the percent error for an idealized function that produces a signal with an amplitude of one. Since this approach is based on minimizing percent error, it is generalized. For example, a system may have a sample rate of 5,859 samples per second. For four seconds of data, the spectrum (FFT window in Welch's method) is 4,096 with an overlap of 2,048. The signal of interest is, for example, 159.2 Hz. From DFT theory, each FFT bin is the sample rate divided by the window, which here is 1.403 Hz. Ideally, the exact bin for the frequency would be 159.2/1.403 or bin 111.296. However, since the bin is an integer, the frequency will fall between bin 111 and bin 112.

To solve and find the best transform, a sample of idealized frequencies is complied, from bin 111 (111*1.403=158.7766 Hz) to 112 (160.2070 Hz). The space is partitioned 50 times, which creates an array with a length of 23,436. Since each bin to bin+1 is the same size, the accuracy of an FFT can be tested for a known transform with a known signal source, s, which has an amplitude of one. Thus, the magnitude of any trail (i.e., the output of the FFT) should be 1, and the frequency of the signal source is denoted as crtfrq. The following pseudo code determines s and crtfrq:

step=sr/win/50
    idx=1, 2, 3, . . . 5859×4
    for i=1:50
    crtfrq=158.7766+step*i;
    s=sin(idx/sr*2*pi*frq).

Figure 7:
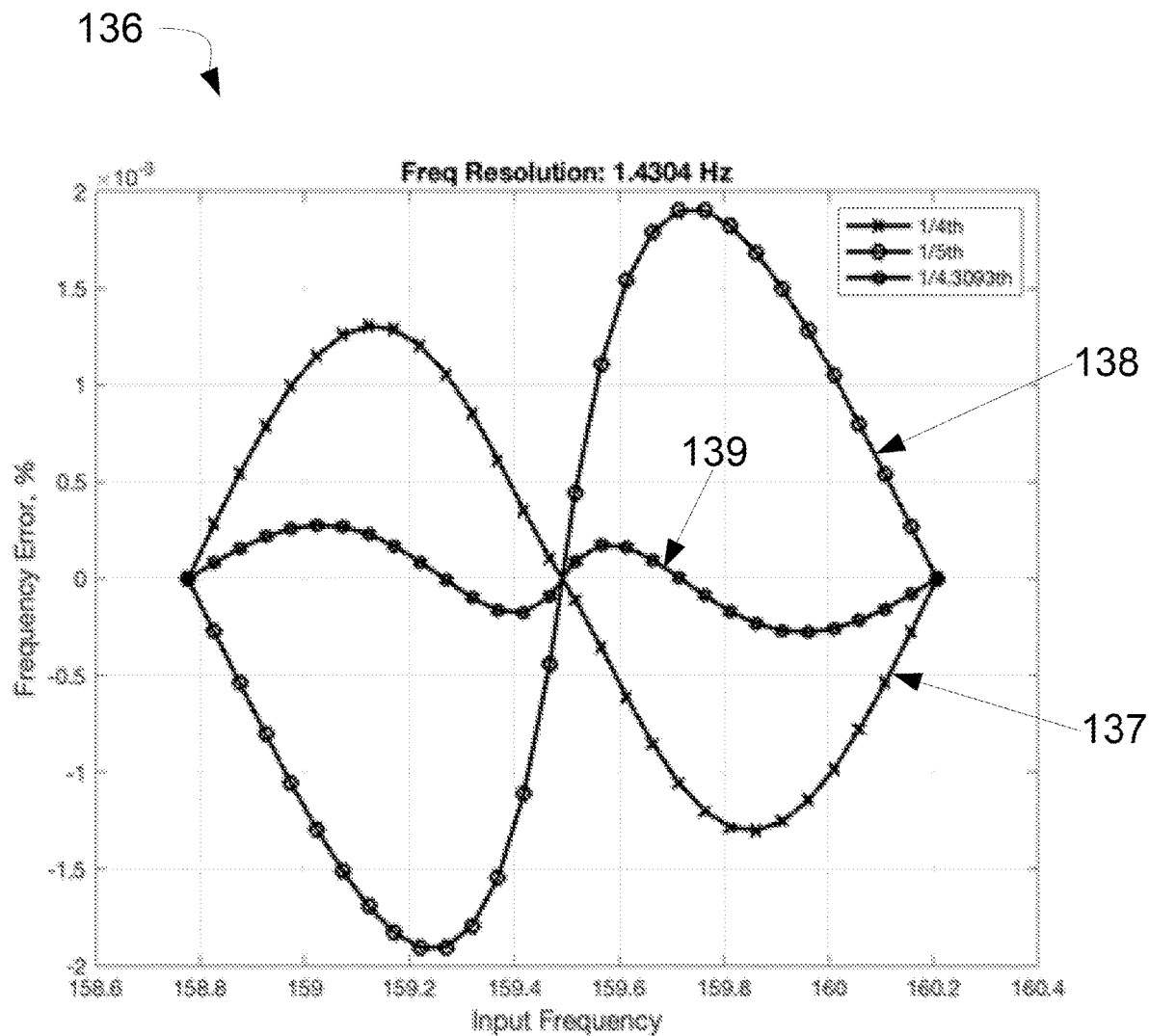
FIG. 7 is a graph comparing percent frequency error of the fourth root, the fifth root, and the optimal root transforms.
Figure 8:
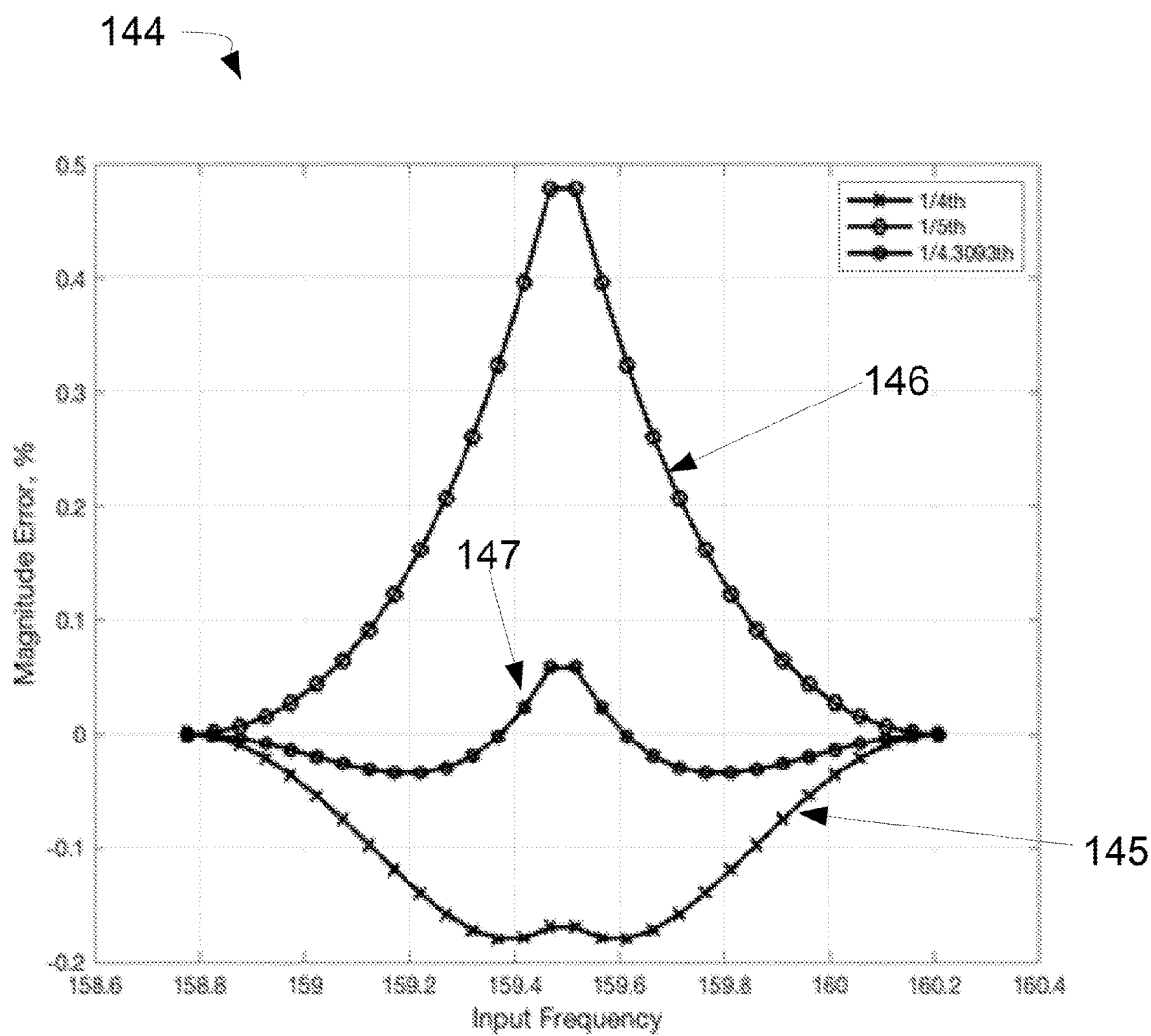
FIG. 8 is a graph comparing percent magnitude error of the fourth root, the fifth root, and the optimal root transforms.

Then the optimal root can be determined by minimizing the percent error in the amplitude, which can be accomplished as follows:

j=30;
    sr=5859:
    n=5859*4;
    win=4096;
    df=sr/win;
    idx=159.2/df;
    % idx=round(159.2/df);
    %% idx=216;
    % fq=df*(idx−0.50);
    start=df*floor(idx);
    en=df*round(idx+1);
    frq=linspace(start,en,j);
    scale=1;
    for i=1:j
    s=sin((1:n)/sr*2*pi*frq(i))*scale;
    [mg(i),fq(i)]=quadInterSpecPeakOps(s,win,root);
    end
    me1=−(scale-mg)/scale*100;
    mse=mean(me1.^2);
    end
    function [mag,freq]=quadInterSpecPeakOps(v,win, root)
    %[mag,freq]=quadInterSpecPeak(v,sr)
    % v: is the signal
    % sr: is the sample rate
    % quadratic interpolation of the spectral peaks
    sr=5859;
    [spc,~]=psde(v,win,sr,win/2);
    [~,idx]=max(spc);
    abg=spc([idx−1 idx idx+1]);
    abg=nthroot(abg,root);
    p=½*(abg(1)−abg(3))/(abg(1)−2*abg(2)+abg(3));   % interp peak bin
    freq=(idx+p−1)*sr/win;
    mag=abg(2)−¼*(abg(1)−abg(3))*p;
    mag=mag.^root;
    end In FIG. 7, a graph 136 is shown of the frequency error for the magnitude estimations based on a fourth root transform 137, a fifth root transform 138, and a transform 139 based on the determined optimal root of 4.3093. In FIG. 8, a graph 144 shows the percent error for magnitude estimates based on a fourth root transform 145, a fifth root transform 146, and a transform 147 based on the determined optimal root of 4.3093. The optimal root of 4.3093 was robust in that it did not change with changes in window size, such as from 8,192 to 16,384 to 32,768.

Table 1 compiles the maximum percent magnitude error, maximum percent frequency error, and mean magnitude error for estimations in the above example based on the various transformations that can be used as part of the interpolation.

| Transform | Max. Mag. Error | Max. Freq. Error | Mean Mag. Error |
| --- | --- | --- | --- |
| RAW FFT | 14.16% | 0.433% | −4.99% |
| Linear | 6.37% | 0.047% | −2.48% |
| Log (dB) | 3.58% | 0.014% | 1.27% |
| $4^{th}$ Root | 0.18% | 0.001% | −0.09% |
| $5^{th}$ Root | 0.48% | 0.002% | 0.15% |
| $4.3093^{th}$ Root | 0.06% | 0.0003% | −0.009% |

As can be seen from the values in Table 1, the magnitude estimation determined using the optimal root transform (in this example, the $4.3093^{th}$ root) derived as described above is on average 190 times lower in error compared to the log transform. For the frequency estimation, the result based on the present invention has 60 times lower percent error than the log transform. Using the optimal root for the transform thus greatly improves the mean and maximum error of the parabola interpolation. This in turn improves the estimated values of spectral analysis of signals processed using a FFT based on the optimal root transform.

Figure 9:
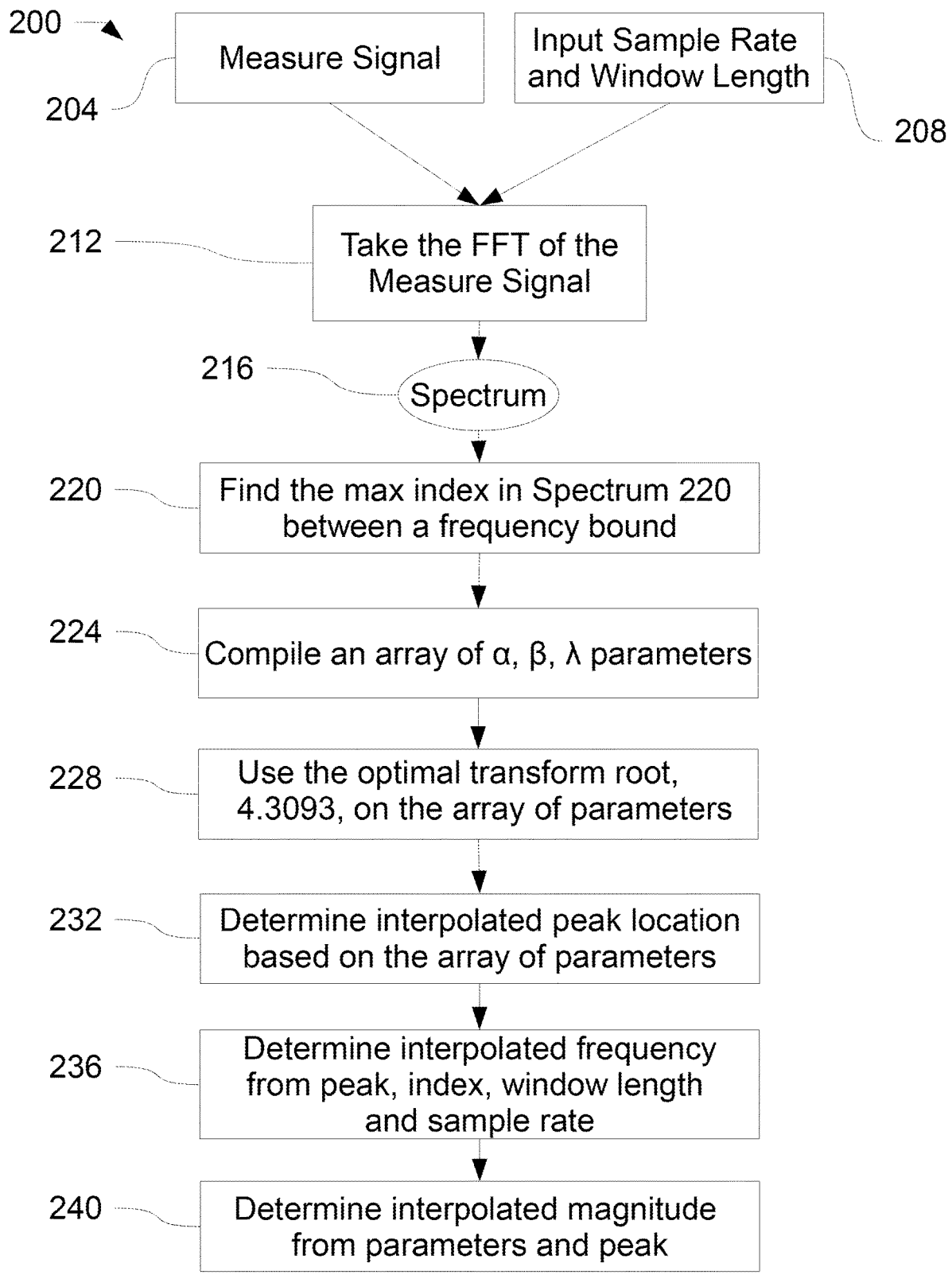
FIG. 9 outlines a process for estimating the magnitude and frequency of a signal from a sinusoidal wave in accordance with an embodiment of the present invention.

Turning to FIG. 9, an overview of an estimation process, such as estimation process 200, is shown that includes measuring a periodic signal at step 204 and inputting a sample rate and a window length at step 208. At step 212, a FFT is taken using Welch's method, which generates a spectrum 216 for the measured signal. Then, at step 220, the maximum index in spectrum 216 is found between a determined frequency bound. At step 224, an array is compiled of the $\alpha$, $\beta$, and $\lambda$ parameters from three points that serve as the points through which a polynomial is fitted for the data for spectrum 216. The optimal transform root of 4.3093, as determined as described above, is used at step 228 to on the array of parameters, which minimizes the percent error of the estimated frequency and magnitude. From those parameters, an interpolated peak location, p, is determined at step 232. Then, at step 236, the interpolated frequency is determined using Equation 13, and at step 240 the interpolated magnitude is determined using Equation 14.

In an embodiment, a system for monitoring ball bearings in a component on a helicopter is provided in which a vibrational spectrum could include a frequency of interest at any frequency. An accelerometer is positioned in proximity of the ball bearing such that vibrational energy from the bearing is detected. Frequency peaks associated with potential faults are determined as described above using an optimized transform root, and the faults may be associated with the inner race, the outer race, the cage, or the ball of the monitored bearing.

Figure 10:
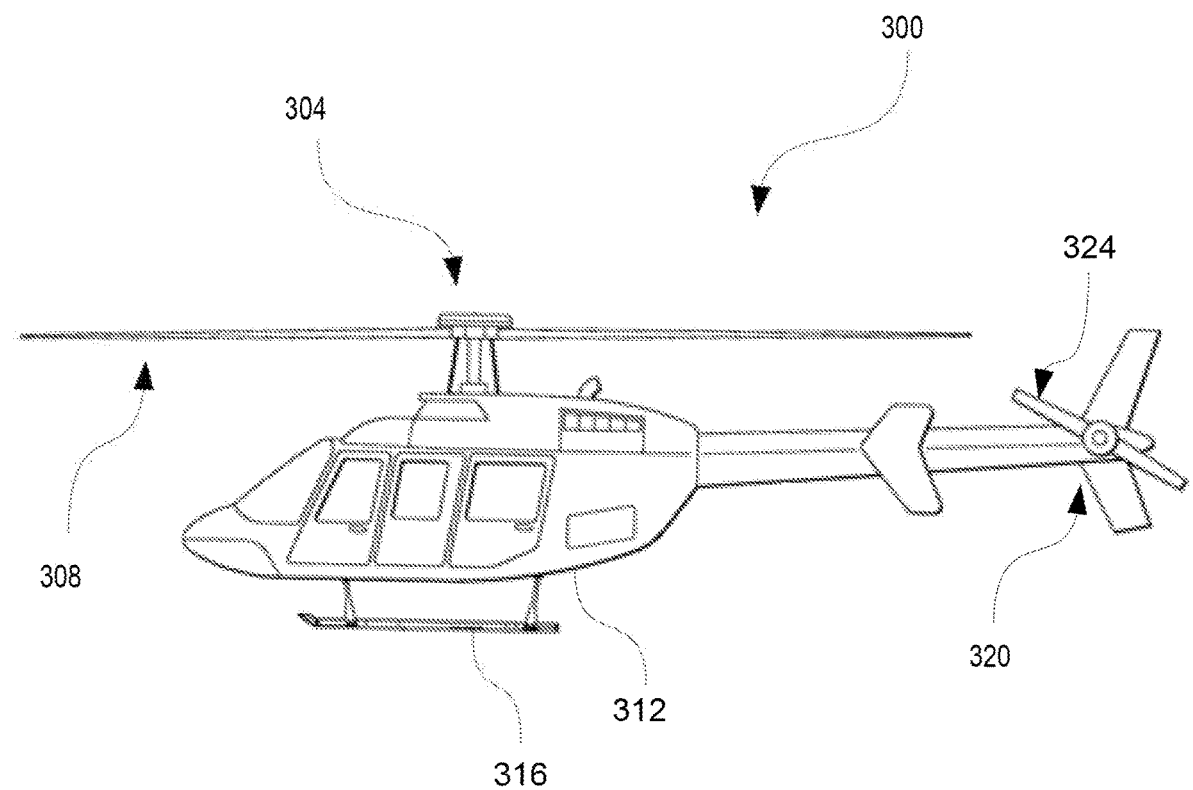
FIG. 10 a schematic view of a helicopter for which components such as ball bearings can be monitored for faults in accordance with an embodiment of the present invention.

In FIG. 10, there is shown a helicopter 300, although it will be understood that the vibrational spectral analyses described herein are applicable to components is various types of vehicles and equipment. At a high level, helicopter 300 includes a rotor system 304, a plurality of blades 308, a fuselage 312, a landing gear 316, and a tail assembly 320. Rotor system 304 is generally designed and configured to rotate the plurality of blades 308 and can include a control system for selectively controlling the pitch of each the plurality of blades 308 so as to control direction, thrust, and lift of helicopter 300. Rotor system 304 is coupled to fuselage 312, which is generally designed to carry the operator and other passengers, among other things. Fuselage 312 is coupled to landing gear 316, which supports helicopter 300 when helicopter 300 is landing and/or when helicopter 300 is at rest on the ground. Tail assembly 320 represents the tail section of the aircraft and can feature component similar to rotor system 304 and includes blades 324. Blades 324 may provide thrust in the same direction as the rotation of blades 308 so as to counter the torque effect created by rotor system 304. Many of the systems on helicopter 300 include various components that undergo wear, tear and fatigue damage over time, and so may exhibit faults embedded in vibrational energy emissions. For any such components that may include faults that could be found at any frequency, a sensor, such as an accelerometer, may be positioned proximate to the component in order to detect vibrational energy emitted by the component. Further, the spectral analysis performed on the detected vibrational energy may be done on the accelerometer itself or another component on helicopter 300 since the analysis described herein does not require a large computational load.

Because the improved estimation of magnitude and frequency does not require significant additional computational load, it can be integrated into a number of applications, including determining the energy associated with a bearing cage, ball, inner or outer race defect from a vibration spectrum. In addition, it may be used to estimate energy radiated from a microcontroller or other electronic device for the purpose of determining whether there will be electromagnetic interference. Another application would be for estimating the sound pressure level from a transformer or other device, or for analyzing the spectral content of ionizing radiation.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for detecting faults for components of a helicopter comprising:
    a ball bearing of a component of the helicopter, wherein the ball bearing includes a cage, a ball, an inner race, and an outer race;
    an accelerometer positioned to detect vibrational energy emitted from the ball bearing, wherein the vibrational energy includes vibrational energy emitted by the cage, the ball, the inner race, and the outer race, wherein the vibrational energy includes at least one periodic, sinusoidal portion, and wherein the accelerometer generates a signal representative of the detected vibrational energy; and
    a processor configured to receive the signal and determine a frequency peak and magnitude of the at least one periodic, sinusoidal portion based on an optimized transform root,
    wherein the processor is configured to execute a set of instructions to:
        take a FFT of the signal using Welch's method to generate a vibrational energy spectrum;
        determine a maximum index in the vibrational energy spectrum between a first frequency bound and a second frequency bound;
        generate an array of parameters, the array of parameters being generated in part based on three data points located near the maximum index;
        determine an interpolated peak location of the vibrational energy spectrum using the optimized transform root;
        determine an interpolated frequency of the interpolated peak location; and
        determine an interpolated magnitude of the spectrum at the interpolated frequency.

2. The system of claim 1, wherein the accelerometer detects the vibrational energy at a sample rate and wherein the first frequency bound and the second frequency bound are determined by the sample rate and the at least one periodic, sinusoidal portion of the vibrational energy.

3. The system of claim 1, wherein the optimized transform root is 4.3093.

4. The system of claim 3, wherein the optimized transform root is determined by minimizing an objective function, wherein the objective function is a percent error of a standard signal source.

5. The system of claim 4, wherein the standard signal source has a known amplitude.

6. The system of claim 5, wherein the three data points include a first point from a maximum bin, a second point from a second bin just prior to the maximum bin, and a third point from a third bin just after the maximum bin.

7. The system of claim 6, wherein the optimized transform root defines a transform that defines a relationship between the first point, the second point, and the third point such that the first point, the second point, and the third point lie on a parabola.

8. A system for detecting faults for components of a helicopter comprising:
    a bearing of a component of the helicopter, wherein the bearing includes a cage, a ball, an inner race, and an outer race;
    an accelerometer positioned to detect vibrational energy emitted from the bearing, wherein the vibrational energy includes vibrational energy emitted by the cage, the ball, the inner race, and the outer race, wherein the vibrational energy includes at least one periodic portion, and wherein the accelerometer generates a signal representative of the detected vibrational energy; and
    a processor configured to receive the signal and determine a frequency peak and magnitude of the at least one periodic portion based on the signal and an optimized transform root,
    wherein the processor is configured to execute a set of instructions to:
        take a FFT of the signal using Welch's method to generate a vibrational energy spectrum;
        determine a maximum index in the vibrational energy spectrum between a first frequency bound and a second frequency bound;
        generate an array of parameters, the array of parameters being generated in part based on three data points located near the maximum index;
        determine an interpolated peak location of the vibrational energy spectrum using the optimized transform root;
        determine an interpolated frequency of the interpolated peak location; and
        determine an interpolated magnitude of the spectrum at the interpolated frequency.

9. The system of claim 8, wherein the accelerometer detects the vibrational energy at a sample rate and wherein the first frequency bound and the second frequency bound are determined by the sample rate and the signal.

10. The system of claim 8, wherein the optimized transform root is 4.3093.

11. The system of claim 10, wherein the optimized transform root is determined by minimizing an objective function, wherein the objective function is a percent error of a standard signal source.

12. The system of claim 11, wherein the standard signal source has a known amplitude.

13. The system of claim 12, wherein the three data points include a first point from a maximum bin, a second point from a second bin just prior to the maximum bin, and a third point from a third bin just after the maximum bin.

14. The system of claim 13, wherein the optimized transform root defines a transform that defines a relationship between the first point, the second point, and the third point such that the first point, the second point, and the third point lie on a parabola.

\* \* \* \* \*